United States Patent
Widrig et al.

(10) Patent No.: US 6,648,597 B1
(45) Date of Patent: Nov. 18, 2003

(54) CERAMIC MATRIX COMPOSITE TURBINE VANE

(75) Inventors: Scott M. Widrig, Hobe Sound, FL (US); Jay Morrison, Oviedo, FL (US); Harry A. Albrecht, Hobe Sound, FL (US); Yevgeniy Shteyman, West Palm Beach, FL (US); Steven C. Butner, Poway, CA (US)

(73) Assignee: Siemens Westinghouse Power Corporation, Orlando, FL (US)

( * ) Notice: Subject to any disclaimer, the term of this patent is extended or adjusted under 35 U.S.C. 154(b) by 0 days.

(21) Appl. No.: 10/158,966

(22) Filed: May 31, 2002

(51) Int. Cl.$^7$ .................................................. F01D 9/04
(52) U.S. Cl. ..................................... 415/200; 415/210.1
(58) Field of Search ................................. 415/191, 200, 415/209.4, 210.1; 29/889.2, 889.22

(56) References Cited

U.S. PATENT DOCUMENTS

| | | |
|---|---|---|
| 3,910,716 A | 10/1975 | Roughgarden et al. |
| 4,076,451 A * | 2/1978 | Jankot ..................... 415/209.2 |
| 4,365,933 A * | 12/1982 | Langer et al. ........... 415/210.1 |
| 4,396,349 A | 8/1983 | Hueber |
| 4,519,745 A | 5/1985 | Rosman et al. |
| 4,530,884 A | 7/1985 | Erickson et al. |
| 4,563,125 A | 1/1986 | Boudigues et al. |
| 4,563,128 A | 1/1986 | Rossmann |
| 4,629,397 A | 12/1986 | Schweitzer |
| 4,639,189 A | 1/1987 | Rosman |
| 4,643,636 A | 2/1987 | Libertini et al. |
| 4,645,421 A | 2/1987 | Huether |
| 4,768,924 A | 9/1988 | Carrier et al. |
| 4,790,721 A | 12/1988 | Morris et al. |
| 4,838,031 A | 6/1989 | Cramer |
| 4,907,946 A | 3/1990 | Ciokajlo et al. |
| 5,027,604 A | 7/1991 | Krueger |
| 5,226,789 A | 7/1993 | Donges |
| 5,306,554 A | 4/1994 | Harrison et al. |
| 5,314,309 A | 5/1994 | Blakeley et al. |
| 5,328,331 A | 7/1994 | Bunker et al. |
| 5,358,379 A | 10/1994 | Pepperman et al. |
| 5,375,978 A | 12/1994 | Evans et al. |
| 5,382,453 A | 1/1995 | Mason |
| 5,484,258 A | 1/1996 | Isburgh et al. |
| 5,493,855 A | 2/1996 | Walters et al. |
| 5,494,402 A | 2/1996 | Glezer et al. |
| 5,584,652 A | 12/1996 | Shaffer et al. |
| 5,605,046 A | 2/1997 | Liang |
| 5,616,001 A | 4/1997 | Boyd |
| 5,630,700 A | 5/1997 | Olsen et al. |
| 5,640,767 A | 6/1997 | Jackson et al. |
| 5,720,597 A | 2/1998 | Wang et al. |
| 5,791,879 A | 8/1998 | Fitzgerald et al. |
| 5,820,337 A | 10/1998 | Jackson et al. |
| 6,000,906 A | 12/1999 | Draskovich |
| 6,164,903 A | 12/2000 | Kouris |
| 6,197,424 B1 | 3/2001 | Morrison et al. |
| 6,200,092 B1 | 3/2001 | Koschier |
| 6,241,469 B1 | 6/2001 | Beeck et al. |
| 6,325,593 B1 | 12/2001 | Darkins, Jr. et al. |
| 6,368,663 B1 | 4/2002 | Nakamura et al. |

* cited by examiner

Primary Examiner—Ninh H. Nguyen

(57) ABSTRACT

A ceramic matrix composite material (CMC) vane for a gas turbine engine wherein the airfoil member (12) and the platform member (14) are formed separately and are then bonded together to form an integral vane component (10). Airfoil member and the platform member may be bonded together by an adhesive (20) after being fully cured. Alternatively, respective joint surfaces (16, 18) of the green body state airfoil member and platform member may be co-fired together to form a sinter bond (30). A mechanical fastener (38) and/or a CMC doubler (42) may be utilized to reinforce the bonded joint (40). A matrix infiltration process (50) may be used to create or to further strengthen the bond.

34 Claims, 3 Drawing Sheets

CERAMIC MATRIX COMPOSITE TURBINE VANE

FIELD OF THE INVENTION

This invention relates generally to the field of gas turbine engines, and more particularly to a ceramic matrix composite airfoil member for a gas turbine engine and a method of manufacturing the same.

BACKGROUND OF THE INVENTION

Gas turbine engines are known to include a compressor section for supplying a flow of compressed combustion air, a combustor section for burning a fuel in the compressed combustion air, and a turbine section for extracting thermal energy from the combustion air and converting that energy into mechanical energy in the form of a shaft rotation. Many parts of the combustor section and turbine section are exposed directly to the hot combustion gasses, for example the combustor, the transition duct between the combustor and the turbine section, and the turbine stationary vanes, rotating blades and surrounding ring segments.

It is also known that increasing the firing temperature of the combustion gas may increase the power and efficiency of a combustion turbine. Modern high efficiency combustion turbines have firing temperatures in excess of 1,600 ° C., which is well in excess of the safe operating temperature of the structural materials used to fabricate the hot gas flow path components. Special super alloy materials have been developed for use in such high temperature environments, and these materials have been used with specific cooling arrangements, including film cooling, backside cooling and insulation.

Ceramic and ceramic matrix composite (CMC) materials offer the potential for higher operating temperatures than do metal alloy materials due to the inherent nature of ceramic materials. This capability may be translated into a reduced cooling requirement that, in turn, may result in higher power, greater efficiency, and/or reduced emissions from the machine. High temperature insulation for ceramic matrix composites has been described in U.S. Pat. No. 6,197,424 B1, which issued on Mar. 6, 2001, and is commonly assigned with the present invention. That patent describes an oxide-based insulation system for a ceramic matrix composite substrate that is dimensionally and chemically stable at a temperature of approximately 1600° C. That patent also describes a stationary vane for a gas turbine engine formed from such an insulated CMC material.

Prior art ceramic turbine airfoil members may be formed with an associated shroud or platform member. The platform defines a flow path between adjacent airfoil members for directing the hot combustion gasses past the airfoil members. The platform is exposed to the same high temperature gas environment as the airfoil member and thus may be formed of a ceramic or CMC material. The platform and the airfoil members may be formed as separate components that are unconnected and are allowed to have relative movement there between. However, such designs may not adequately transfer aerodynamic torque loads from the airfoil to the platform attachments. Alternatively, the platform and the airfoil may be formed as separate components that are mechanically joined together, as illustrated in U.S. Pat. No. 5,226,789. Such mechanical joints must be robust and thus tend to be complicated and expensive.

Another alternative for joining the airfoil and the platform is to form the platform and the airfoil as a single integral part. Monolithic ceramic is readily moldable to form, but it is limited to small shapes and is insufficiently strain tolerant for robust designs. CMC materials incorporate ceramic fibers in a ceramic matrix for enhanced mechanical strength and ductility. However, conventional ceramic composite processing methods increase in complexity and cost in a complex three-dimensional component such as a turbine vane. U.S. Pat. No. 6,200,092 describes a turbine nozzle assembly having a vane forward segment formed of CMC material wherein the reinforcing fibers are specially oriented across the juncture of the airfoil and the platform members. Such special fiber placement in the airfoil-to-platform transition region presents a manufacturing challenge, especially with insulated CMC construction. Furthermore, for some CMC compositions, shrinkage during processing may result in residual stresses in complex shapes that are geometrically constrained. The airfoil-to-platform attachment area is one area where such stresses would arise. Additionally, load transfer between the airfoil and the platform results in interlaminar stresses in the fillet region where mechanical properties may be compromised.

The drying of the prepreg fabric restricts the lay-up time available in wet lay-up processes. For large complex shaped parts, such as an integrally formed airfoil/shroud vane, the required lay-up time may exceed the allowable exposure time for the prepreg. Consequently, some portions of the component may dry before others, resulting in possible shrinkage cracks and related problems. Furthermore, the consolidation of complex parts frequently requires pressure application in multiple directions, thus requiring complex tooling and consolidation challenges.

SUMMARY OF THE INVENTION

A method of manufacture for a vane component of a gas turbine is described herein as including: forming an airfoil member of a ceramic matrix composite material; forming a platform member of a ceramic matrix composite material; and forming an integral vane component by bonding respective joint surfaces of the airfoil member and the platform member. The method may further include: forming the airfoil member of a ceramic matrix composite material in a green body state; forming the platform member of a ceramic matrix composite material in a green body state; and urging the respective joint surfaces of the airfoil member and the platform member together at a firing temperature to form a sinter bond there between. The method may include densifying the sinter bond with a matrix infiltration process. The method may further include reinforcing the sinter bond with a fastener connected between the respective joint surfaces. Alternatively, the method may include bonding the respective joint surfaces of the airfoil member and the platform member with an adhesive.

A vane component for a gas turbine is described herein as including: an airfoil member formed of a ceramic matrix composite material; a platform member formed of a ceramic matrix composite material; and a bond between respective joint surfaces of the airfoil member and the platform member. The bond may be a sinter bond formed by urging the respective joint surfaces together in a green body state at a firing temperature. The component may further include a density-increasing material infused into the sinter bond by a matrix infiltration process. The component may include a fastener connected between the respective joint surfaces. The bond may be an adhesive bond. The component may include a mechanical fastener connected between the respective joint surfaces, or a ceramic matrix composite reinforcing member sinter bonded to the respective joint surfaces.

The reinforcing member may be a generally U-shaped cross-section having opposed legs disposed on opposed sides of the respective joint surfaces.

BRIEF DESCRIPTION OF THE DRAWINGS

These and other advantages of the invention will be more apparent from the following description in view of the drawings that show.

Identical and similar structures that are illustrated in more than one Figure are designated with the same numeral in all Figures.

DETAILED DESCRIPTION OF THE INVENTION

Figure 1:
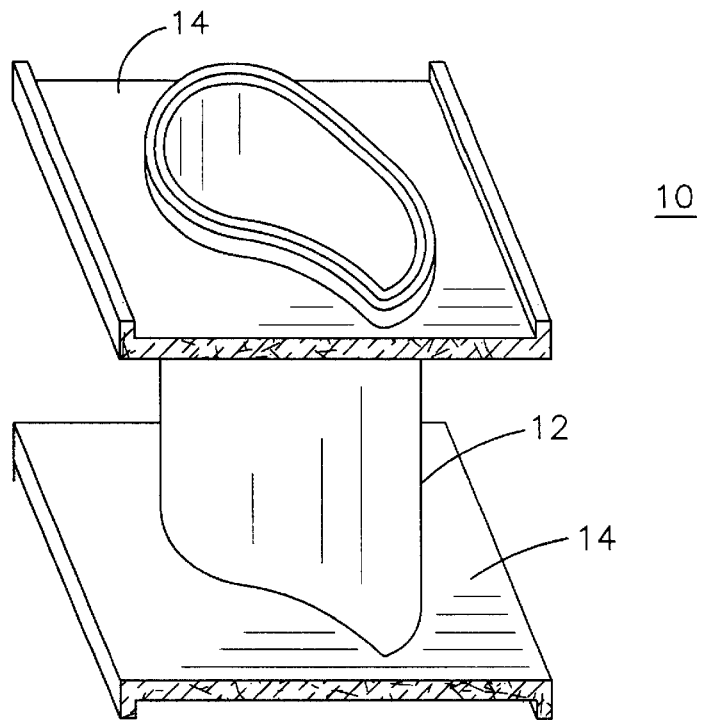
FIG. 1 is a perspective view of a gas turbine vane having a CMC airfoil member integrally bonded to a separately formed CMC platform member.

A gas turbine vane component 10 having a ceramic matrix composite (CMC) airfoil member 12 integrally bonded to at least one shroud or platform member 14 is illustrated in FIG. 1. The airfoil member 12 and the platform member 14 are bonded to each other along respective joint surfaces 16, 18, as may be better seen in the various embodiments of FIGS. 2–6, to form an integral vane component 10.

Figure 2:
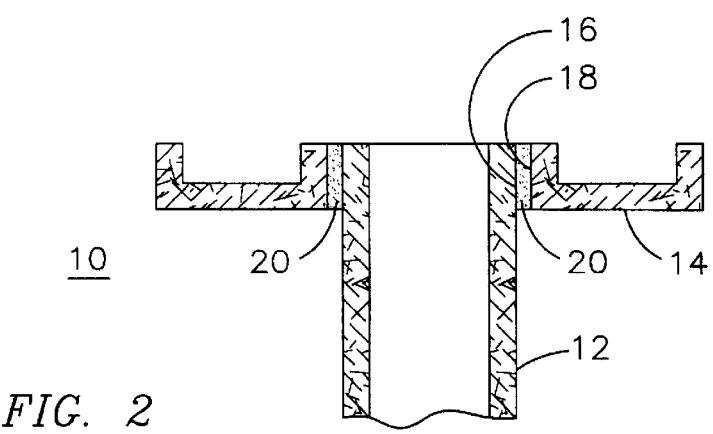
FIG. 2 is a partial cross-sectional view of one embodiment of the bond between the airfoil member and the platform member of FIG. 1.
Figure 7:
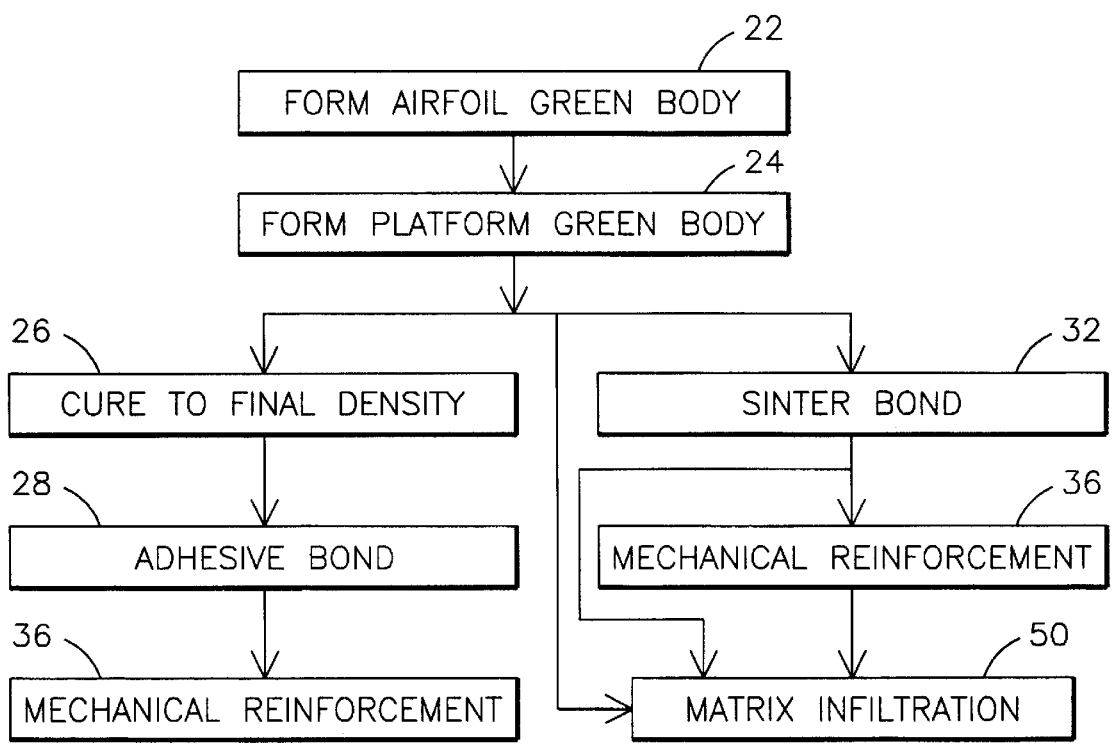
FIG. 7 is a block diagram of the steps of a process that may be used to form the gas turbine vane of FIG. 1.

FIG. 2 illustrates one embodiment of turbine vane 10 wherein airfoil member 12 and platform 14 are bonded with an adhesive 20, for example a high temperature ceramic adhesive such as from Cotronics (Resbond 989 or 904), Aremco (Ceramabond 503, 600, or 516), Sauerizon (phosphate based adhesives), or Zircar (ZR-COM) or variations on these basic adhesive types. The airfoil member 12 and the platform member 14 may each be formed separately of CMC materials using processes well known in the art. The ceramics utilized for the CMC material may be oxide or non-oxide materials, for example alumina, mullite, silcon carbide, etc. Because each of these components is a relatively simple shape, they may be formed using simplified tooling and fabrication methods. The airfoil member is formed to the green body state at step 22 of FIG. 7 and the platform member is formed to the green body state at step 24. The terms green body and green body state are used herein to include stages of processing from still-wet perform to the semi-fired state where the parts are rigid enough to be self-supporting. The airfoil member 12 and/or the platform member 14 may be produced from a plurality of individual parts that are bonded or joined together in any variety of ways, or they may be formed as single-piece parts. For the embodiment of FIG. 2 wherein an adhesive is used to bond the airfoil 12 and platform 14, each of the green body parts are first cured to a final density at step 26 in order to allow shrinkage to occur prior to bonding, so that close tolerance fits can be maintained and so that residual stresses can be minimized. The joint surface 16 of the airfoil member 12 is then bonded to the joint surface 18 of the platform member 14 by a layer of adhesive 20 at step 28. The adhesive may be applied in accordance with known procedures and in accordance with the adhesive manufacturer's instructions. Note that the geometry of the adhesive joint may be designed to place the adhesive 20 in a relatively cooler area of the component when compared to areas exposed most directly to the hot combustion gasses.

Figure 3:
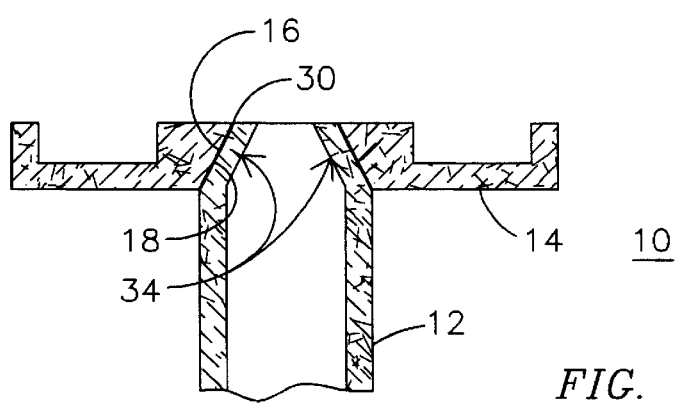
FIG. 3 is a partial cross-sectional view of a second embodiment of the bond between the airfoil member and the platform member of FIG. 1.

FIG. 3 illustrates another embodiment of a bond 30 between the airfoil member 12 and the platform member 14. In this embodiment, the bond 30 is a sinter bond formed at step 32 by urging the respective joint surfaces 16, 18 of the green body airfoil member 12 and platform member 14 together at a firing temperature. The term firing temperature is used herein to mean a temperature sufficiently high to cause curing, densification and sintering of the green body CMC materials to a final cured state. A typical firing temperature of 1,200–1,400 ° C. may be used for 1–5 hours to cure an alumina-based CMC material. The bond 30 provides a solid joint between the airfoil member 12 and platform member 14 without the need for special pre-form lay-up procedures.

The bond 30 of the embodiment of FIG. 3 is further enhanced by the tapered joint geometry 34. The joint surface 18 of platform member 14 is formed to include opposed sides that are disposed in a non-parallel orientation to define a tapered opening. The joint surface 16 of airfoil member 12 is similarly formed to include opposes sides that are disposed in a non-parallel orientation corresponding to the orientation of the platform member joint surface 18. The airfoil member joint surface 16 is inserted into the platform member tapered opening so that the respective joint surfaces 16,18 are urged together during the curing process to form the sinter bond 30. One may appreciate that an adhesive joint may be utilized in lieu of the sinter bond 30 with a tapered joint geometry 34.

Figure 4:
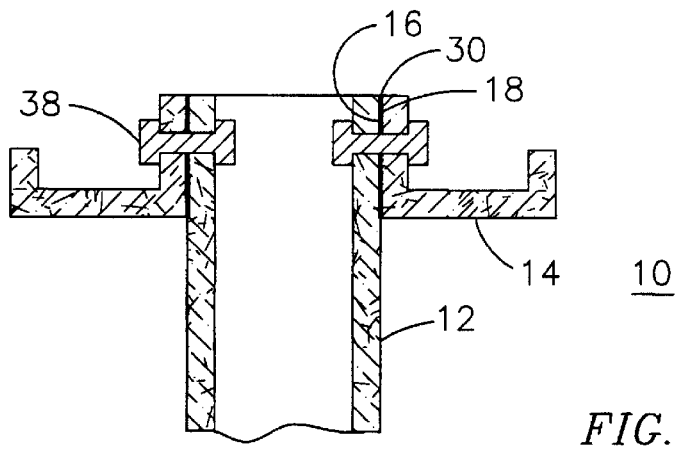
FIG. 4 is a partial cross-sectional view of a third embodiment of the bond between the airfoil member and the platform member of FIG. 1.

FIG. 4 illustrates another embodiment of a vane 10 wherein airfoil member 12 are joined to form an integral component by a bond such as sinter bond 30, and that bond 30 is reinforced at step 36 by a reinforcing member such as a mechanical fastener 38. The mechanical fastener 38 may be a bolt, clamp, pin, spring member, etc., and it may be formed of any compatible material such as a metal alloy or composite material such as a CMC material. The fastener 38 serves to provide compressive force between respective joint surfaces 16, 18 and/or to function as a shear pin to resist sliding motion there between. The fastener 38 may be used to hold the airfoil member 12 and platform 14 together during the step 32 of forming the sinter bond 30. Similarly, if an adhesive bond were to be used in place of the sinter bond 30, the fastener 38 may be used to secure the parts while the adhesive cures at step 28 and may thus be integrally bonded to both parts.

Figure 5:
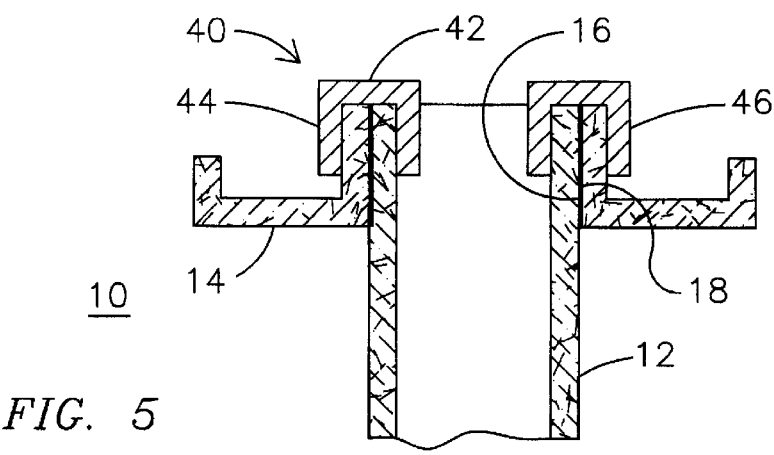
FIG. 5 is a partial cross-sectional view of a fourth embodiment of the bond between the airfoil member and the platform member of FIG. 1.

FIG. 5 illustrates another embodiment of a vane 10 having a joint 40 between airfoil member 12 and platform 14 wherein a CMC doubler reinforcing member 42 is placed across the joint 40 to reinforce the bond between the respective joint surfaces 16, 18. The airfoil member 12 and platform member 14 are formed of a CMC material in a green body shape, then doubler 42 is formed in a CMC green body shape to have a generally U-shaped cross-section with opposed legs 44, 46 disposed on opposes sides of joint 40.

The entire assembly is then exposed to a firing temperature to co-cure and to sinter the entire joint 40 into an integral part.

Figure 6:
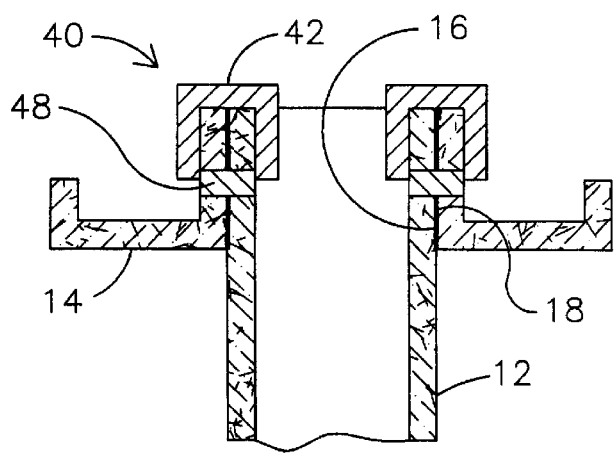
FIG. 6 is a partial cross-sectional view of a fifth embodiment of the bond between the airfoil member and the platform member of FIG. 1.

FIG. 6 illustrates a further embodiment of a vane 10 wherein joint 40 includes a shear pin 48 that is retained in position by generally U-shaped reinforcing member 42. In this embodiment, each of the airfoil member 12, platform member 14, reinforcing member 42 and shear pin 48 may be formed of CMC materials that are brought together in their green body state and then co-fired to form an integral vane component 10.

For CMC processes such as slurry infiltration, sol-gel infiltration, polymer infiltration and pyrolysis (PIP), chemical vapor infiltration (CVI) or melt infiltration (MI) where several matrix infiltration steps may be required to achieve full desired density, the joint 30, 40 may be formed at step 50 through the co-infiltration of the assembled subcomponents 12, 14, 42, 48. This approach may also be used in conjunction with the co-curing method to further strengthen the joint that was previously made by a sinter bond. The infiltrate may be the original matrix material (slurry, sol-gel, polymer precursor, etc.) or a subset of the original matrix (e.g. the solution minus the particulate additives).

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

We claim:

1. A method of manufacture for a vane component of a gas turbine, the method comprising:
    forming an airfoil member of a ceramic matrix composite material;
    forming a platform member of a ceramic matrix composite material; and
    forming an integral vane component by bonding respective joint surfaces of the airfoil member and the platform member.

2. The method of claim 1, further comprising:
    forming the platform member joint surface to comprise opposed sides disposed in a non-parallel orientation to define a tapered opening;
    forming the airfoil member joint surface to comprise opposed sides disposed in a non-parallel orientation corresponding to the orientation of the platform member joint surface;
    inserting the airfoil member joint surface into the platform member tapered opening for bonding the respective joint surfaces to form a tapered joint.

3. The method of claim 2, further comprising applying a mechanical preload on the tapered joint.

4. The method of claim 2, further comprising:
    forming the airfoil member of a ceramic matrix composite material in a green body state;
    forming the platform member of a ceramic matrix composite material in a green body state; and
    urging the respective joint surfaces of the airfoil member and the platform member together at a firing temperature to form a sinter bond there between.

5. The method of claim 2, further comprising bonding the respective joint surfaces of the airfoil member and the platform member with an adhesive.

6. The method of claim 1, further comprising:
    forming the airfoil member of a ceramic matrix composite material in a green body state;
    forming the platform member of a ceramic matrix composite material in a green body state; and
    urging the respective joint surfaces of the airfoil member and the platform member together at a firing temperature to form a sinter bond there between.

7. The method of claim 6, further comprising densifying the sinter bond with a matrix infiltration process.

8. The method of claim 6, further comprising reinforcing the sinter bond with a fastener connected between the respective joint surfaces.

9. The method of claim 1, further comprising bonding the respective joint surfaces of the airfoil member and the platform member with an adhesive.

10. The method of claim 9, further comprising curing both the airfoil member and the platform member to a final density prior to the step of bonding with an adhesive.

11. The method of claim 10, further comprising reinforcing the adhesive with a mechanical fastener connected between the respective joint surfaces.

12. The method of claim 1, further comprising:
    forming the airfoil member of a ceramic matrix composite material in a green body state;
    forming the platform member of a ceramic matrix composite material in a green body state;
    urging the respective joint surfaces of the airfoil member and the platform member together to define a joint;
    applying a reinforcing member of a ceramic matrix composite material in a green body state across the joint; and
    curing the airfoil member, platform member and reinforcing member together to form the integral vane component.

13. The method of claim 12, further comprising densifying the joint with a matrix infiltration process.

14. The method of claim 12, further comprising forming the reinforcing member to have a generally U-shaped cross-section having opposed legs disposed on opposed sides of the joint.

15. The method of claim 12, wherein the reinforcing member comprises a shear pin disposed across the joint.

16. The method of claim 1, further comprising attaching a fastener between the respective joint surfaces.

17. The method of claim 16, further comprising inserting a shear pin across the respective joint surfaces.

18. The method of claim 17, further comprising retaining the shear pin in position with a ceramic matrix composite reinforcing member having a generally U-shaped cross-section spanning the respective joint surfaces with opposed legs disposed on opposed sides of the shear pin.

19. The method of claim 1 further comprising:
    forming the airfoil member of a ceramic matrix composite material in a green body state;
    forming the platform member of a ceramic matrix composite material in a green body state; and
    urging the respective joint surfaces of the airfoil member and the platform member together during a matrix infiltration process to form a bond there between.

20. A vane component for a gas turbine comprising:
    an airfoil member formed of a ceramic matrix composite material;
    a platform member formed of a ceramic matrix composite material; and a bond between respective joint surfaces of the airfoil member and the platform member.

21. The component of claim 20, further comprising:

the platform member joint surface comprising opposed sides disposed in a non-parallel orientation to define a tapered opening in the platform member;

the airfoil member joint surface comprising opposed sides disposed in a non-parallel orientation corresponding to the orientation of the platform member joint surface; and the airfoil member joint surface being inserted into the platform member tapered opening to form a tapered joint.

22. The component of claim 21, wherein the bond comprises a sinter bond formed by urging the respective joint surfaces together in a green body state at a firing temperature.

23. The component of claim 21, wherein the bond comprises an adhesive bond.

24. The component of claim 20, wherein the bond comprises a sinter bond formed by urging the respective joint surfaces together in a green body state at a firing temperature.

25. The component of claim 24, further comprising a density-increasing material infused into the sinter bond by a matrix infiltration process.

26. The component of claim 24, further comprising a fastener connected between the respective joint surfaces.

27. The component of claim 20, wherein the bond further comprises an adhesive bond.

28. The component of claim 27, further comprising a mechanical fastener connected between the respective joint surfaces.

29. The component of claim 20, further comprising a ceramic matrix composite reinforcing member sinter bonded to the respective joint surfaces.

30. The component of claim 29, further comprising a density-increasing material infused into the sinter bond by a matrix infiltration process.

31. The component of claim 29, wherein the reinforcing member comprises a generally U-shaped cross-section having opposed legs disposed on opposed sides of the respective joint surfaces.

32. The component of claim 29, further comprising a shear pin disposed across the respective joint surfaces.

33. The component of claim 32, further comprising a ceramic matrix composite reinforcing member having a generally U-shaped cross-section spanning the respective joint surfaces with opposed legs disposed on opposed sides of the shear pin.

34. The component of claim 20, wherein the bond comprises a material introduced by a matrix infiltration process.

* * * * *